United States Patent [19]

Fickler

[11] Patent Number: 4,494,025
[45] Date of Patent: Jan. 15, 1985

[54] LINEAR DRIVE DEVICE WITH TWO MOTORS

[76] Inventor: Hans Fickler, Weidstrasse 18, CH 8542 Wiesendangen, Switzerland

[21] Appl. No.: 603,235

[22] Filed: Apr. 23, 1984

[30] Foreign Application Priority Data

Apr. 29, 1983 [CH] Switzerland .......................... 2303/83

[51] Int. Cl.³ .......................... H02K 7/06; H02K 7/20; F16H 21/16
[52] U.S. Cl. ...................................... 310/80; 310/83; 310/112; 74/25; 74/89.15; 74/127
[58] Field of Search .................. 310/80, 83, 112, 114, 310/124, 191, 209, 49 R; 74/847, 10.21, 10.54, 10.8, 10.85, 25, 63, 127, 89.15

[56] References Cited

U.S. PATENT DOCUMENTS

| | | | |
|---|---|---|---|
| 3,407,680 | 10/1968 | Westmoreland | 310/112 X |
| 3,824,420 | 7/1974 | Stegeman | 310/80 |
| 3,855,487 | 12/1974 | Boisseau | 310/80 |
| 4,066,922 | 1/1978 | Hennemann | 310/80 |
| 4,122,377 | 10/1978 | Drummond | 310/112 X |
| 4,288,168 | 9/1981 | Mayr et al. | 310/112 X |

FOREIGN PATENT DOCUMENTS

664263  5/1979  U.S.S.R. ............................. 310/80

Primary Examiner—Mark O. Budd
Attorney, Agent, or Firm—Tilton, Fallon, Lungmus & Chestnut

[57] ABSTRACT

The linear feed device is suitable for extremely slow feed rates or extremely small feed steps. It works with two motors ($M_1$, $M_2$) which drive a nut (16) and a screw spindle (2) via an intermediate drive (12–15; 22–25). The intermediate drives have slightly different transmission ratios, e.g., 1:0.340909 and 1:0.3414634.

With a thread pitch of 2 mm of the spindle, this results, with the same direction of rotation of the motors, in about 0.0013 mm advance per revolution of the motor shafts. With the help of step motors, therefore, extremely small advance steps can be achieved.

7 Claims, 1 Drawing Figure

U.S. Patent   Jan. 15, 1985   4,494,025
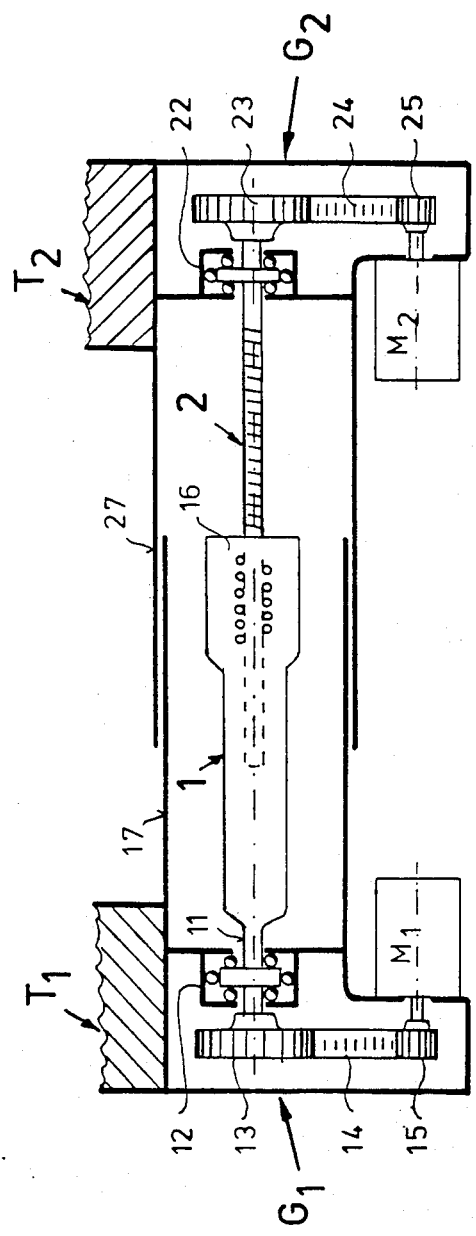

LINEAR DRIVE DEVICE WITH TWO MOTORS

BACKGROUND AND SUMMARY OF INVENTION

The invention relates to a linear drive device wth two motors, in which one motor drives a nut, the other a screw spindle. Such a device in comparison with a device that works with only one motor, which drives the spindle, for example, has the advantage of a much greater range of control for the feed rate.

A creeping, very slow feed can be achieved if both motors have the same direction of rotation but are operated with a slight difference in rpm. A fast feed can be achieved if only one motor is operated and the other one remains inoperative an, finally, a very fast feed can be obtained if the motors are operated in opposite directions. Such linear drives are known, e.g., from PCT/CH No. 82/00129.

In these known linear drives a very slow feed is achieved by having both motors operate in the same direction of rotation, but with only a slight difference in the number of rpm. If the feed is to be extremely slow or in extremely small steps, step motors with electronic control are necessary that can make 100 or more steps per revolution. Such electronic controls, however, are very expensive.

The invention addresses the problem of creating a linear drive device of the desired kind which makes possible an extremely slow feed rate and extremely small feed steps more simply and more inexpensively.

The invention solves this problem with a linear drive device wherein one motor drives the screw spindle via first intermediate drive and the other motor drives the screw by means of a hollow shaft via a second intermediate drive. Additionally, the two intermediate drives have a very slight but precisely defined difference in their transmission ratio. This slight but precisely defined difference in the transmission ratios results with the same direction of rotation and the same number of rpm in a very low feed rate, which can be decreased even more by a change in the rpm. If step motors are used, feed steps under 1/1000 mm can be obtained.

DETAILED DESCRIPTION

The drawing represents a linear drive device in longitudinal section.

The lefthand part of the FIGURE shows a housing part $G_1$, in which a hollow shaft 1, supported without play axially and radially, and an intermediate drive are accommodated. The bearing end of the hollow shaft terminates in a bearing journal 11 that is provided with a collar that makes possible a play-free axial-radial bearing arrangement 12. A toothed belt gear is fastened to the free end of the bearing journal 11 which is driven by means of a toothed belt 14.

Flange-mounted on the housing $G_1$ is a motor $M_1$, whose shaft extends into the housing and carries a pinion 15. The free end of the hollow shaft 1 is enlarged to accommodate a ballbearing rotating nut. This nut is represented schematically in the drawing only by the ballbearings 16.

The righthand half of the FIGURE shows housing part $G_2$, in which a screw spindle 2 fitting the ballbearing rotating nut 16 is supported axially and radially without play. The other parts, namely, the bearing arrangement 22, the toothed belt gear 23, the toothed belt 24, the toothed belt pinion 25, match the above-described parts 12–15.

Flange-mounted on the outside of the housing part $G_2$ is a motor $M_2$. The housing halves $G_1$, $G_2$ are connected solidly with two machine parts $T_1$, $T_2$ which are to be moved relatively to each other.

The two housing halves are provided with telescopingly movable casings 17, 27 that protect the spindle from external influences.

Instead of being only protection, the two casings 17, 27 can also be made so that they constitute a guide for the housing halves $G_1$, $G_2$ and at the same time provide a safeguard against the twisting of the two halves $G_1$, $G_2$. It is also possible to provide the housing halves with guide rods on the inside or outside which guide the two housing halves accurately and insure against twisting.

The transmission ratios of the two intermediate drives 13–15 and 23–25 are slightly different.

The following applies for the example shown:

Gear 13 has 44 teeth and pinion 15 has 15 teeth. This gives a transmission ratio $U=15/44=0.340909$.
and
gear 23 has 41 teeth and pinion 25 has 14 teeth. This gives a transmission ratio $U=14/41=0.3414634$.

If both motors $M_1$, $M_2$ rotate in the same direction, the nut makes 0.340909 rotation and the spindle 0.3414634 rotation. Since the direction of rotation is the same, this means $0.3414634-0.340909=0.0006524$ rotation of the spindle relative to the nut. With spindle thread pitch of 2 mm, this means an advance of 0.0013048 mm.

If both motors make a complete revolution of 360°, the advance amounts to somewhat more than 1/1000 mm. If step motors are used, they can be so controlled that the linear drive device, e.g., at the pushing of a button, each time advances a machine part, e.g., a cross table by 1/1000 mm.

With such small feed steps it is, of course, essential that all the parts work without play. This can be achieved by using slightly pretensioned roller bearings, by a play free ballbearing rotating nut with polished spindle and play free toothed belts.

When using the linear drive for the movement of a crosstable which, as described above permits feeding with extremely small steps, there still remains the possibility of a rapid movement. If only one motor is operated, with the other one at rest, a fast feed results. If the second motor is operated in the opposite direction, the feed rate even doubles. The transmission of the intermediate drive, which is, of course, only about 1 to 3, plays no great role in this case.

In addition to the described use of the linear drive for the driving of a cross table, where it is a matter of advance and stop, the linear drive can also be used for a continuous, extremely slow feed. Such an application comes into play, e.g., for solar energy installations, where mirrors must follow the sun.

I claim:

1. A linear drive device with a screw spindle and a nut with two drive motors, characterized by the fact that one motor ($M_2$) drives the screw spindle (2) via a first intermediate drive and the other motor ($M_1$) drives the nut (16) by means of a hollow shaft (1) via a second intermediate drive (13–15) and that the two intermediate drives have a very slight but precisely defined difference in their transmission ratio.

2. A drive device according to claim 1, characterized by the fact that the motors ($M_1$, $M_2$) are step motors.

3. A drive device according to claim 1, characterized by the fact that the intermediate drives are play-free toothed belt drives (13-15; 23-25).

4. A drive device according to claim 1, characterized by the fact that the intermediate drives are gear drives.

5. A drive device according to claim 1, characterized by the fact that the screw spindle and the hollow shaft are supported axially play-free (12, 22) and that the nut is a ballbearing rotating nut (16) that interacts play-free with the screw spindle (2).

6. A drive device according to claim 5, with a closed housing, characterized by the fact that the hollow shaft with nut, its axial-radial bearing arrangement and one intermediate drive are accommodated in a first housing part ($G_1$), that the spindle, its axial-radial bearing arrangement and the other intermediate drive are accommodated in a second housing part ($G_2$), and that these housing parts are mounted so as to move relative to each other in the spindle axial direction and that the motors ($M_1$, $M_2$) are flange-mounted on the outside of these housing parts.

7. A drive device according to claim 6, characterized by the fact that the two housing parts are secured against twisting around the spindle's longitudinal axis.

* * * * *